United States Patent
Sweney et al.

(10) Patent No.: US 11,590,829 B2
(45) Date of Patent: Feb. 28, 2023

(54) FUNCTIONAL INTERLAYERS FOR VEHICLE GLAZING SYSTEMS

(71) Applicant: Tesla, Inc., Palo Alto, CA (US)

(72) Inventors: William S. Sweney, Oakland, CA (US); Mike Laurin, San Pedro, CA (US); Erin Mathews, Palo Alto, CA (US); Michael Pilliod, Los Angeles, CA (US)

(73) Assignee: Tesla, Inc., Austin, TX (US)

( * ) Notice: Subject to any disclaimer, the term of this patent is extended or adjusted under 35 U.S.C. 154(b) by 143 days.

(21) Appl. No.: 16/523,205

(22) Filed: Jul. 26, 2019

(65) Prior Publication Data

US 2020/0031206 A1  Jan. 30, 2020

Related U.S. Application Data

(60) Provisional application No. 62/711,381, filed on Jul. 27, 2018.

(51) Int. Cl.

| | |
|---|---|
| *B32B 15/04* | (2006.01) |
| *B32B 17/06* | (2006.01) |
| *B60J 1/02* | (2006.01) |
| *B32B 17/10* | (2006.01) |

(52) U.S. Cl.
CPC .............. *B60J 1/02* (2013.01); *B32B 17/1077* (2013.01); *B32B 17/10357* (2013.01); *B32B 17/10376* (2013.01); *B32B 17/10752* (2013.01); *B32B 17/10761* (2013.01); *B32B 17/10788* (2013.01); *B32B 17/10275* (2013.01); *B32B 17/10339* (2013.01); *B32B 2307/4023* (2013.01)

(58) Field of Classification Search
CPC ........ B32B 17/10376; B32B 17/10357; B32B 2307/4023; B32B 17/10339
USPC .................................. 428/426, 428, 432
See application file for complete search history.

(56) References Cited

U.S. PATENT DOCUMENTS

| | | | | |
|---|---|---|---|---|
| 2,636,420 | A | * | 4/1953 | Ryan ....................... C03C 17/32 501/71 |
| 3,973,058 | A | * | 8/1976 | Grover ..................... B41M 1/30 427/256 |
| 3,982,984 | A | * | 9/1976 | Baldridge ............. B32B 37/003 428/210 |
| 4,035,549 | A | * | 7/1977 | Kennar ............. B32B 17/10339 428/409 |
| 5,130,174 | A | * | 7/1992 | Esposito ........... B32B 17/10339 428/210 |
| 5,914,178 | A | * | 6/1999 | Sol .................... B32B 17/10761 428/195.1 |
| 2006/0013997 | A1 | * | 1/2006 | Kuepper ............... C03C 17/005 428/174 |
| 2016/0288459 | A1 | * | 10/2016 | Keller ................. B32B 17/1022 |
| 2019/0381766 | A1 | * | 12/2019 | Mellor ............. B32B 17/10348 |

* cited by examiner

*Primary Examiner* — Lauren R Colgan
(74) *Attorney, Agent, or Firm* — Knobbe Martens Olson & Bear LLP

(57) ABSTRACT

A glass structure for a vehicle includes an outer layer of glass, an inner layer of glass, and an interlayer stack disposed between opposing surfaces of the outer layer of glass and the inner layer of glass. The interlayer stack includes at least two interlayer substrates and at least one of the interlayer substrates includes a decorative treatment. In another example, the interlayer stack includes at least two interlayer substrates and at least one of the interlayer substrates includes a functional component.

12 Claims, 6 Drawing Sheets

| Impact Energy of Tempered Glass with Various Inks, Coatings, and Frit Systems | | | | | | | | | | | | | | | | | |
|---|---|---|---|---|---|---|---|---|---|---|---|---|---|---|---|---|---|
| Sample | | 1 | 2 | 3 | 4 | 5 | 6 | 7 | 8 | 9 | 10 | 11 | 12 | 13 | 14 | 15 | 16 |
| Tempered Glass (No coating) | Energy at last pass (j) | 25 | 30 | 30 | 35 | 35 | | 30 | 30 | 40 | 40 | 35 | 35 | 40 | | | |
| | Energy at Fail (j) | 30 | 35 | 35 | 40 | 40 | 35 | 35 | 35 | 45 | 40 | 40 | 40 | 45 | 40 | | |
| Non-frit Coating #1 | Energy at last pass (j) | 40 | 40 | | | 35 | 40 | 40 | 35 | 35 | 40 | 40 | 35 | | 30 | 35 | 35 |
| | Energy at Fail (j) | 45 | 45 | 40 | 35 | 40 | 45 | 40 | 40 | 40 | 45 | 40 | 40 | 35 | 35 | 40 | 40 |
| Non-frit Coating #2 | Energy at last pass (j) | 35 | 35 | 40 | | | 30 | 40 | 40 | 35 | 35 | 45 | 45 | 40 | 40 | 55 | |
| | Energy at Fail (j) | 40 | 40 | 45 | 40 | 35 | 35 | 45 | 40 | 40 | 40 | 50 | 45 | 45 | 40 | 65 | 55 |
| Non-frit Coating #3 | Energy at last pass (j) | 30 | 40 | | | | 25 | 25 | 25 | 25 | | 20 | 25 | 40 | 40 | | |
| | Energy at Fail (j) | 35 | 45 | 40 | 35 | 30 | 30 | 30 | 30 | 30 | 25 | 25 | 30 | 45 | 45 | 40 | 35 |
| Non-frit Ink #1 | Energy at last pass (j) | 30 | 40 | 40 | 40 | | 40 | 45 | 45 | 40 | 35 | 30 | 30 | 30 | 30 | 30 | 45 |
| | Energy at Fail (j) | 35 | 45 | 45 | 45 | 35 | 45 | 50 | | | | 35 | 35 | 35 | 35 | 35 | 50 |
| Non-frit Ink #2 | Energy at last pass (j) | 45 | | 40 | 45 | | 40 | | 35 | | 30 | 30 | 35 | 35 | 45 | 55 | |
| | Energy at Fail (j) | 50 | 45 | 45 | 50 | 45 | 45 | 40 | 40 | 35 | 35 | 35 | 40 | 40 | 50 | 60 | 55 |
| Non-frit Ink #3 | Energy at last pass (j) | 45 | 55 | 55 | 50 | 45 | 50 | 50 | 45 | 45 | 45 | 40 | 40 | 40 | 50 | | 45 |
| | Energy at Fail (j) | 50 | 60 | | 50 | 50 | 55 | | | 50 | | | | 45 | 55 | 50 | |
| Low Temperature Frit | Energy at last pass (j) | | | | | 5 | 5 | 5 | 5 | 5 | 5 | 5 | 5 | 5 | 5 | 5 | 5 |
| | Energy at Fail (j) | 25 | 20 | 15 | 10 | 10 | 10 | 10 | 10 | 10 | 10 | 10 | 10 | 10 | 10 | 10 | 10 |
| Glass with Frit | Energy at last pass (j) | | | | | | | | | | | | | | | | |
| | Energy at Fail (j) | 25 | 20 | 15 | 10 | 5 | 5 | 6 | 5 | 7 | 6 | 6 | 6 | 6 | 6 | 5 | |

FIG. 2

FUNCTIONAL INTERLAYERS FOR VEHICLE GLAZING SYSTEMS

CROSS-REFERENCE TO RELATED APPLICATIONS

This application claims priority to U.S. Provisional Application No. 62/711,381, filed Jul. 27, 2018, entitled "Functional Interlayers for Vehicle Glazing Systems," the contents of which are hereby incorporated by reference in their entirety.

BACKGROUND

Technical Field

The present disclosure relates to glass structures for use in vehicles and more particularly to glass structures including an interlayer stack made of diverse materials for increased strength and functionality.

Description of Related Art

Windows used in passenger vehicles such as cars, trucks, and the like are typically made of by combining two layers of glass and a layer of polymer, such as polyvinyl butyral. However, conventional vehicle windows like these have certain limitations, including placing decorations or functional components on the glass itself. Processes for adding the decorations or functional components to the window during manufacturing may introduce defects to the finished window, such as lowering the overall strength of the structure or creating micro fractures. These defects may in turn increase the chances of a critical failure in the structure or introduce undesirable properties to the windows such as optical distortion.

SUMMARY

As the size and number of glass structures used in vehicles increases it may be desirable for the glass structures to be adaptable for a wider range of applications. Incorporating these glass structures into vehicles may require a higher strength than conventional systems, a wider variety of decoration design choices, and a desire for increased functionality of the glass. One way to accomplish these goals is to increase the functionality of the layers that make the glass structure by incorporating an interlayer stack between two layers of glass instead of a single interlayer (e.g., a polymer layer) present in conventional systems. Using an interlayer stack allows for improvements in the design and manufacturing of the glass structure that increase the overall strength of the structure, while increasing the flexibility of decoration and functional design choices.

In some embodiments, a glass structure for a vehicle includes an outer layer of glass, an inner layer of glass, and an interlayer stack disposed between opposing surfaces of the outer layer of glass and the inner layer of glass, wherein the interlayer stack includes at least two interlayer substrates and at least one of the interlayer substrates includes a decorative treatment. In some embodiments, a glass structure for a vehicle includes an outer layer of glass, an inner layer of glass, and an interlayer stack disposed between opposing surfaces of the outer layer of glass and the inner layer of glass, wherein the interlayer stack includes at least two interlayer substrates and at least one of the interlayer substrates includes a functional component.

BRIEF DESCRIPTION OF THE DRAWINGS

FIG. 2 is a table illustrating the results of a study comparing the impact energy of tempered glass with various decorative systems applied.

Figure 1:
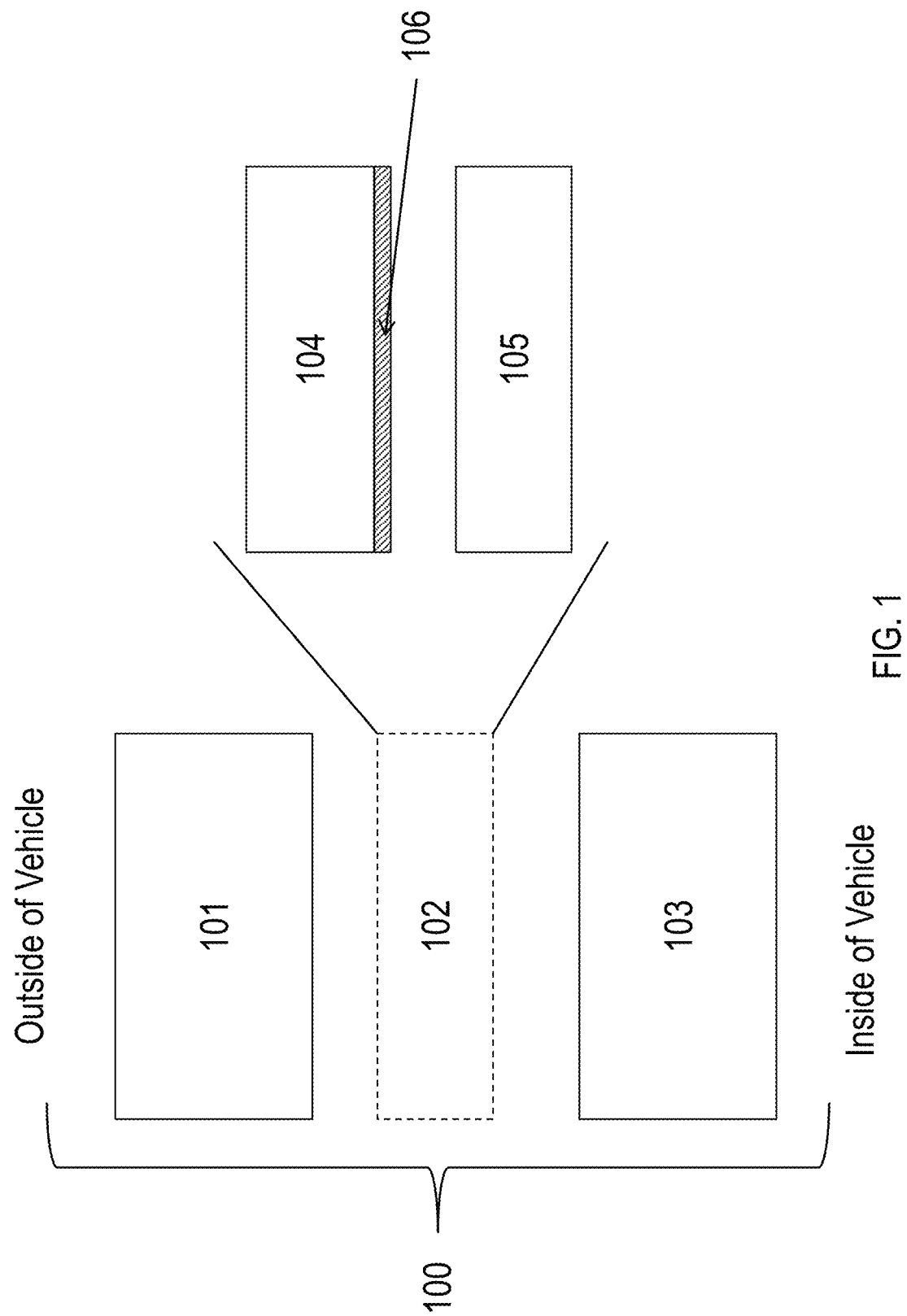
FIG. 1 illustrates an example of the glass structure according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure provides examples of systems and techniques for providing a glass structure (e.g., window) to be used in a vehicle. Exemplary structures disclosed are capable of providing increased strength and functionality when used in vehicles relative to conventional glass structures. In one example, the increased strength of the glass structure is provided by incorporating an interlayer stack instead of a single interlayer substrate of material between two panes of glass. The interlayer stack includes multiple interlayer substrates on which desired decorations or functional elements may be incorporated. By incorporating these elements on the interlayer substrates themselves less stress is placed on the layers of glass during manufacturing. For example, in conventional window structures any decoration is typically comprised of ceramic frits which must be fired with a layer of glass in order to adhere the ceramic to the glass. This process lowers the overall strength of the glass and increases the probability of creating a defect. Conversely, in the exemplary structures disclosed herein the decorations may be printed onto the interlayer substrate. This process can be performed before incorporating the substrate into the glass structure and allows the layers of glass to retain the strength by not exposing the glass to the forces of ceramic firing. Conventional window structures may also have decreased dimensional stability and increased optical distortion due to conventional manufacturing processes. Conversely, because the exemplary structures disclosed herein do not require the use of such conventional manufacturing processes they have improved dimensional stability and decreased optical distortion in comparison to conventional window structures.

Reference will now be made in detail to specific aspects or features, examples of which are illustrated in the accompanying drawings. Like reference numerals refer to corresponding parts throughout the figures.

FIG. 1 illustrates an embodiment of glass structure 100 according to some embodiments. The glass structure 100 includes an outer layer of glass 101, an interlayer stack 102, and an inner layer of glass 103. Interlayer stack 102 is disposed between opposing surfaces of the outer layer of glass 101 and the inner layer of glass 103. The outer layer of glass 101 may be any type of glass suitable for use in a vehicle. For example, the outer layer of glass 101 may comprise typical glass used in the windows of vehicles (e.g., annealed soda lime glass, alumina silicate, borosilicate). Similarly, the inner layer of glass 103 may also be any type of glass suitable for use in a vehicle. For example, the inner layer of glass 103 may comprise typical glass used in the windows of vehicles (e.g., annealed soda lime glass, alumina silicate, borosilicate).

The outer layer of glass 101 and the inner layer of glass 103 may be of any feasible thickness, for example between 0.55 mm and 5 mm.

Interlayer stack 102 is comprised of at least two interlayer substrates, 104 and 105. In some embodiments, interlayer stack 102 is comprised of more than two interlayer substrates. For example, interlayer stack 102 may include any feasible number of interlayer substrates (e.g., three, four, five, six, etc.). Increasing the number of interlayer substrates included in interlayer stack 102 may increase the functionality of the interlayer stack 102, allowing for unique capabilities. Further, using additionally interlayer substrates may allow for different arrangements within the interlayer stack 102 increasing the flexibility in designing the glass structure 100.

Interlayer substrates 104 and 105 may be comprised of any suitable polymer or resin that may be extruded into sheets. For example, interlayer substrates 104 and 105 may be comprised of polyvinyl butyral, ethylene vinyl acetate, thermoplastic urethane, polyethylene terephthalate, ionomer, polycarbonate or other materials (e.g., polymers) containing bisphenol A, non-plasticized polyvinyl butyral, thermoplastic urethane, aliphatic thermoplastic urethane, or any other suitable material. Interlayer substrates may be of any feasible thickness, for example between 0.05 mm and 1 mm. In some embodiments, the interlayer substrate used may be of varying hardness. For example, an interlayer substrate may be comprised of aliphatic thermoplastic urethane with a hardness shore between D 40 and D 70.

Interlayer substrates 104 and 105 may provide one or more of adhesion, color, stiffness, impact resistance, infrared absorption, and acoustic absorption to the interlayer stack. Interlayer substrates 104 and 105 create adhesion between the outer layer of glass 101 and the inner layer of glass 103 as well as between each other to create a cohesive glass structure 100. Further, interlayer substrates 104 and 105 may provide greater stiffness to the interlayer stack 102 and thus the glass structure 100 overall. Interlayer substrate 104 and 105 may also provide favorable absorption characteristics, reducing the amount of unwanted noise and light that passes through the interlayer stack 102, the glass structure 100, and ultimately reaches the interior of the vehicle.

In some embodiments, each of the interlayer substrates 104 and 105 are comprised of different materials. In some embodiments, each of the interlayer substrates 104 and 105 are comprised of the same material.

In some embodiments, interlayer substrates 104 and 105 are coextruded. The materials used to make a coextruded layer may be any of the materials used as an individual interlayer substrate. A coextruded layer may be made of two or more materials which may be chosen to provide specific benefits to the interlayer substrate and thus the interlayer stack. For example, a three layer coextruded interlayer may be produced with a core layer of polycarbonate with color additives to match the body color of a vehicle and a layer of thermal plastic urethane on either side to facilitate lamination to the outer and inner layers of glass.

Interlayer substrate 104 further includes decorative treatment 106. Decorative treatment 106 is printed directly onto interlayer substrate 104 and is disposed between interlayer substrates 104 and 105. In some embodiments, decorative treatment 106 is disposed between interlayer substrate 104 and outer layer of glass 101. In some embodiments, decorative treatment 106 is disposed between interlayer substrate 105 and inner layer of glass 103.

In some embodiments, interlayer stack 102 includes multiple decorative treatments. In some embodiments, each interlayer substrate 104 and 105 includes a decorative treatment. In some embodiments, interlayer substrate 104 or 105 includes multiple decorative treatments, one decorative treatment 106 printed on each side of interlayer substrate 104 or 105. In some embodiments, decorative treatment 106 is printed on interlayer substrate 105.

Although in the present embodiment only one decorative treatment 106 is included in one interlayer substrate 104, it should be understood that interlayer stack 102 may include any number of feasible decorative treatments, including one decorative treatment on each side of the interlayer substrate. For example, if interlayer stack 102 includes four interlayer substrates, each of the interlayer substrates could include two decorative treatments, one on each side, giving a total of eight possible decorative treatments.

Decorative treatment 106 may be comprised of any feasible dye or pigment based ink system. Accordingly, decorative treatment 106 may be applied to interlayer substrate 104 using any feasible printing technique. For example, decorative treatment 106 may be applied to interlayer substrate 104 by screen printing, digital printing, flexographic printing, or rotogravure printing. In some embodiments, decorative treatment 106 may be created using a film, coating, coextruded layer, deposited layer, or molded layer. In other embodiments, decorative treatment 106 may be an additive incorporated into an adhesive, one of the substrates, or a combination including at least one of the foregoing, such as giving a substrate the properties of decorative treatment 106 without forming a separate layer.

Applying decorative treatment 106 to interlayer substrate 104 provides multiple benefits to glass structure 100. In conventional glass structures any decorations are comprised of ceramic frits that are bonded directly to the glass layers in a difficult firing process. Accordingly, design choices in conventional systems are very limited, typically restricting the color of ceramic used to black. Because decorative treatment 106 is applied directly to interlayer substrate 104 using printing techniques the manufacturing process as a whole is simpler and more efficient. Further, printing decorative treatment 106 in this manner allows for complete customization of decorative treatment 106 depending on the vehicle and glass structure incorporating interlayer substrate 104. Accordingly, the flexibility of designs in decorative treatment 106 and thus glass structure 100 is much higher than that of conventional glass structures. For example, in some embodiments decorative treatment 106 may match the color of the vehicle that includes glass structure 100.

In some embodiments, decorative treatment 106 is only applied to portions of interlayer substrate 104. In some embodiments, decorative treatment 106 is colored in some portions and transparent in other portions. In some embodiments, decorative treatment 106 is a predetermined pattern. In some embodiments, decorative treatment 106 gradually fades from a color in some portions to transparent in other portions. For example, decorative treatment 106 may be the same color as the vehicle that includes glass structure 100 on the outer edge of decorative treatment 106 and fade to transparent as the center of decorative treatment 106 is approached. In some embodiments, the fade pattern provides a shading effect to reduce the intensity of the sun on the interior of the vehicle.

Applying decorative treatment 106 to interlayer substrate 104 provides several manufacturing advantages in addition to the material advantages previously discussed. For example, by printing decorative treatment 106 onto interlayer substrate 104 large quantities may be produced in a comparatively short amount of time. This allows for a higher degree of customization because each unique decorative treatment may be produced quickly. Thus, resulting glass structures can be produced faster and with more customization than conventional glass structures.

Additionally, because decorative treatment 106 is printed onto interlayer substrate 104, the firing process used to attach ceramic frits to glass in conventional glass structures is no longer needed. When this firing process is used to create conventional glass structures the glass is weakened, resulting in a reduction of the amount of force a layer of glass may absorb before breaking. Performing the firing process in traditional systems also creates temperature gradients in the glass layers which increases optical distortion. By removing the need to perform the firing process each glass layer retains its full original strength and reduces the probability of creating optical distortion. Accordingly, the resulting glass structure has higher clarity and impact resistance over conventional glass structures.

FIG. 2 is a table illustrating the results of a study comparing the impact energy of tempered glass with various decorative systems applied. The table shows the results of testing using a Bruceton Staircase methodology, meaning that the sample of glass was impacted with a given energy that was increased until the sample of glass failed. If the sample of glass failed during the first test then only an energy at failure was recorded, however if multiple passes were completed then the energy used at last pass and at failure is recorded. Without any decoration applied tempered glass failed when subjected to between 30 and 40 joules of energy. In contrast, when a low temperature frit system was applied to the glass the glass failed when subjected to 10 joules of energy and when a standard frit system was applied to the glass, the glass failed when subjected to between 5 and 7 joules of energy. Thus, conventional glass structures using ceramic frit decorations are known to have a significantly lower strength than standard tempered glass.

FIG. 2 also shows that with a number of different inks and coatings that are not ceramic frits, the strength of the glass did not demonstrably change. Rather, when an ink or coating was applied to the glass, the glass failed when subjected to between 25 and 50 joules of energy, very similar to the amount of energy required to break the tempered glass without any decoration applied. Accordingly, the resulting glass structures incorporating printed decorations exhibit increased strength over conventional systems created with ceramic frit decorations.

Different interlayer substrates may be bonded together using heat and pressure in an autoclave, vacuum bag system, parallel platen system or any system where the temperature and pressure are high enough to cause the interlayers to fuse together and form a bond between the interlayers. It is also possible to bond the interlayer substrates together with any acceptable bonding agent, such as epoxy, resin, glue, etc. Further, the interlayer stack 102 may be bonded to the outer layer of glass 101 and the inner layer of glass 103 using any acceptable bonding agent, such as epoxy, resin, glue, or a process where the temperature and pressure are high enough to cause the interlayers to fuse with the outer and inner layers of glass.

The temperature and pressure required to cause such a fusion of the interlayers with the outer and inner layers of glass is a function of the interlayer material. For example, an ethyl vinyl acetate system can be bonded to other interlayers and the outer and inner layers of glass at 155 C and one atmosphere of pressure in approximately 15 minutes while a polyvinyl butyral system can require 127 C and 160 psi of pressure held for 30 minutes to create a bond.

Figure 3:
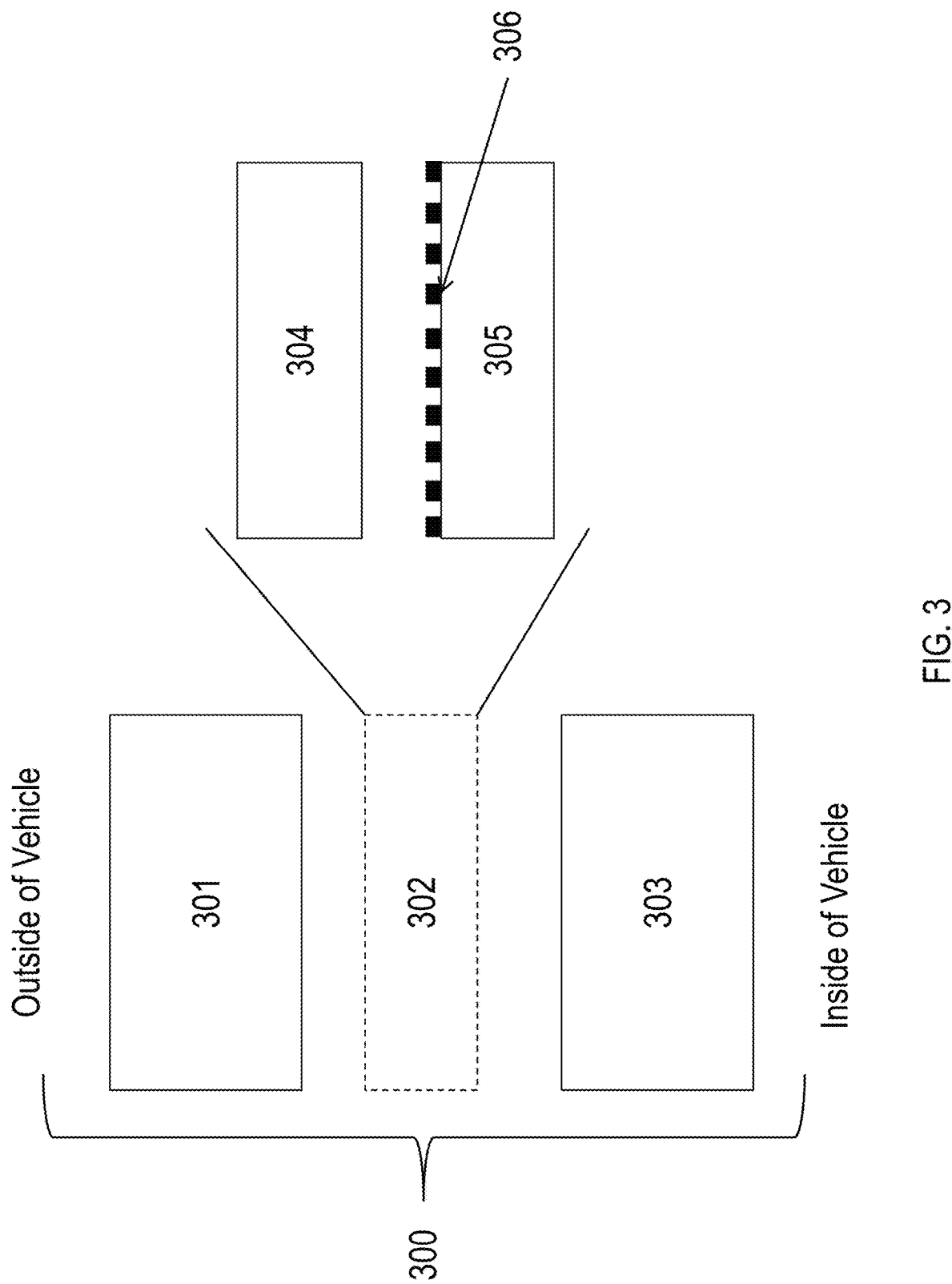
FIG. 3 illustrates an example of the glass structure according to some embodiments.

FIG. 3 illustrates an embodiment of glass structure 300 according to some embodiments. Glass structure 300 is substantially similar to glass structure 100 of the example previously discussed and includes an outer layer of glass 301, an interlayer stack 302, and an inner layer of glass 303. Interlayer stack 302 is disposed between opposing surfaces of the outer layer of glass 301 and the inner layer of glass 303.

Interlayer stack 302 is comprised of at least two interlayer substrates, 304 and 305. In some embodiments, interlayer stack 302 is comprised of more than two interlayer substrates. For example, interlayer stack 302 may include any feasible number of interlayer substrates (e.g., three, four, five, six, etc.). Increasing the number of interlayer substrates included in interlayer stack 302 may increase the functionality of the interlayer stack 302, allowing for unique capabilities. Further, using additionally interlayer substrates may allow for different arrangements within the interlayer stack 302 increasing the flexibility in designing the glass structure 300.

Interlayer substrates 304 and 305 may be comprised of any suitable polymer or resin that may be extruded into sheets. For example, interlayer substrates 304 and 305 may be comprised of polyvinyl butyral, ethylene vinyl acetate, thermoplastic urethane, polyethylene terephthalate, ionomer, polycarbonate or other materials (e.g., polymers) containing bisphenol A, non-plasticized polyvinyl butyral, thermoplastic urethane, aliphatic thermoplastic urethane, or any other suitable material. Interlayer substrates may be of any feasible thickness, for example between 0.05 mm and 1 mm. In some embodiments, the interlayer substrate used may be of varying hardness. For example, an interlayer substrate may be comprised of aliphatic thermoplastic urethane with a hardness shore between D 40 and D 70.

Interlayer substrates 304 and 305 may provide one or more of adhesion, stiffness, infrared absorption, and acoustic absorption to the interlayer stack. Interlayer substrates 304 and 305 create adhesion between the outer layer of glass 301 and the inner layer of glass 303 as well as between each other to create a cohesive glass structure 300. Further, interlayer substrates 304 and 305 may provide greater stiffness to the interlayer stack 302 and thus the glass structure 300 overall. Interlayer substrate 304 and 305 may also provide favorable absorption characteristics, reducing the amount of unwanted noise and light (e.g., ultra violet, visible, or infrared) that passes through the interlayer stack 302, the glass structure 300, and ultimately reaches the interior of the vehicle.

In some embodiments, each of the interlayer substrates 304 and 305 are comprised of different materials. In some embodiments, each of the interlayer substrates 304 and 305 are comprised of the same material.

In some embodiments, interlayer substrates 304 and 305 are coextruded. The materials used to make a coextruded layer may be any of the materials used as an individual interlayer substrate. A coextruded layer may be made of two or more materials which may be chosen to provide specific benefits to the interlayer substrate and thus the interlayer stack. For example, a three layer coextruded interlayer may be produced with a core layer of polycarbonate with color additives to match the body color of a vehicle and a layer of thermal plastic urethane on either side to facilitate lamination to the outer and inner layers of glass.

Interlayer substrate 305 further includes functional component 306. Functional component 306 is attached directly to interlayer substrate 305 and is disposed between interlayer substrates 304 and 305. In some embodiments, functional component 306 is disposed between interlayer substrate 304 and outer layer of glass 301. In some embodiments, functional component 306 is disposed between interlayer substrate 305 and inner layer of glass 303.

In some embodiments, interlayer stack 302 includes multiple functional components. In some embodiments, each interlayer substrate 304 and 305 includes a functional component 306. In some embodiments, interlayer substrate 304 or 305 includes multiple functional components, one functional component 306 attached to each side of the interlayer substrate 304 or 305. In some embodiments, interlayer substrate 304 includes functional component 306.

Although in the present embodiment only one functional component 306 is included in one interlayer substrate 305, it should be understood that interlayer stack 302 may include any number of feasible functional components, including a functional component on each side of the interlayer substrate. For example, if interlayer stack 302 includes four interlayer substrates, each of the interlayer substrates could include two functional components, one on each side, giving a total of eight possible functional components.

In some embodiments the functional component 306 is applied to the entire surface area of interlayer substrate 305. In some embodiments the functional component 306 is localized and only applied to specific desired areas of interlayer substrate 305. For example, functional component 306 may only be applied to the edges of interlayer substrate 305. In some embodiments, functional component 306 is applied to an area where the function provided is advantageous for the occupant. For example, if functional component 306 is a display it may not need to be applied to a large area, rather functional component 306 may only be applied to an area that an occupant of the vehicle expects to see a display.

Functional component 306 may include components such as a conduction system, communications antennae, or display. These systems may be attached to the interlayer substrate 305 using any feasible method. For example, a conduction system may be comprised of conductive ink and printed onto interlayer substrate 305 using any feasible printing method. In some embodiments, functional component 306 may be attached to interlayer substrate 305 using epoxy, resin, or other types of adhesive. Functional component 306 may also be attached to interlayer substrate 305 through vapor deposition including chemical vapor deposition, vacuum metallization, the application of heat, the application of pressure, exposure to ultra violet light, and/or exposure to electron beam radiation. In some embodiments, functional component 306 may be created using a film, coating, coextruded layer, deposited layer, or molded layer. In other embodiments, functional component 306 may be an additive incorporated into an adhesive, one of the substrates, or a combination including at least one of the foregoing, such as giving a substrate the properties of functional component 306 without forming a separate layer.

Incorporating functional component 306 in this manner provides several benefits to glass structure 300. Similarly to the incorporation of decorative treatments in the previous example, attaching functional component 306 directly to interlayer substrate 305 nullifies the need to attach functional component 306 to outer layer of glass 301 or inner layer of glass 303. This prevents the stress of attaching functional component 306 to a layer of glass, preserving the strength of the individual glass layers and decreasing the probability of causing a defect in a glass layer or the glass structure 300 as a whole.

Additionally, by attaching the functional component 306 directly to interlayer substrate 305 many different functions may be incorporated into the interlayer stack 302 and the glass structure 300. Because multiple functional components may be attached to each interlayer substrate and there may be multiple interlayer substrates a comprehensive functional interlayer stack may be created to provide an occupant of vehicle with a number of features. For example, a glass structure may incorporate a conduction system to defrost the glass structure, a communication antennae to facilitate the transmission of multiple types of data to the vehicle, and a display to show the occupants useful information.

Different interlayer substrates may be bonded together with any acceptable bonding agent, such as epoxy, resin, glue, etc. Interlayer substrates may also be bonded together through the application of heat and/or pressure as in an autoclave, parallel platen press, vacuum laminator, or vacuum bag. Further, the interlayer stack 302 may be bonded to the outer layer of glass 301 and the inner layer of glass 303 using any acceptable bonding agent, such as epoxy, resin, glue, etc. The interlayer stack 302 may be also bonded to the outer layer of glass 301 and the inner layer of glass 303 through the application of heat and/or pressure as in an autoclave, parallel platen press, vacuum laminator, or vacuum bag.

Figure 4:
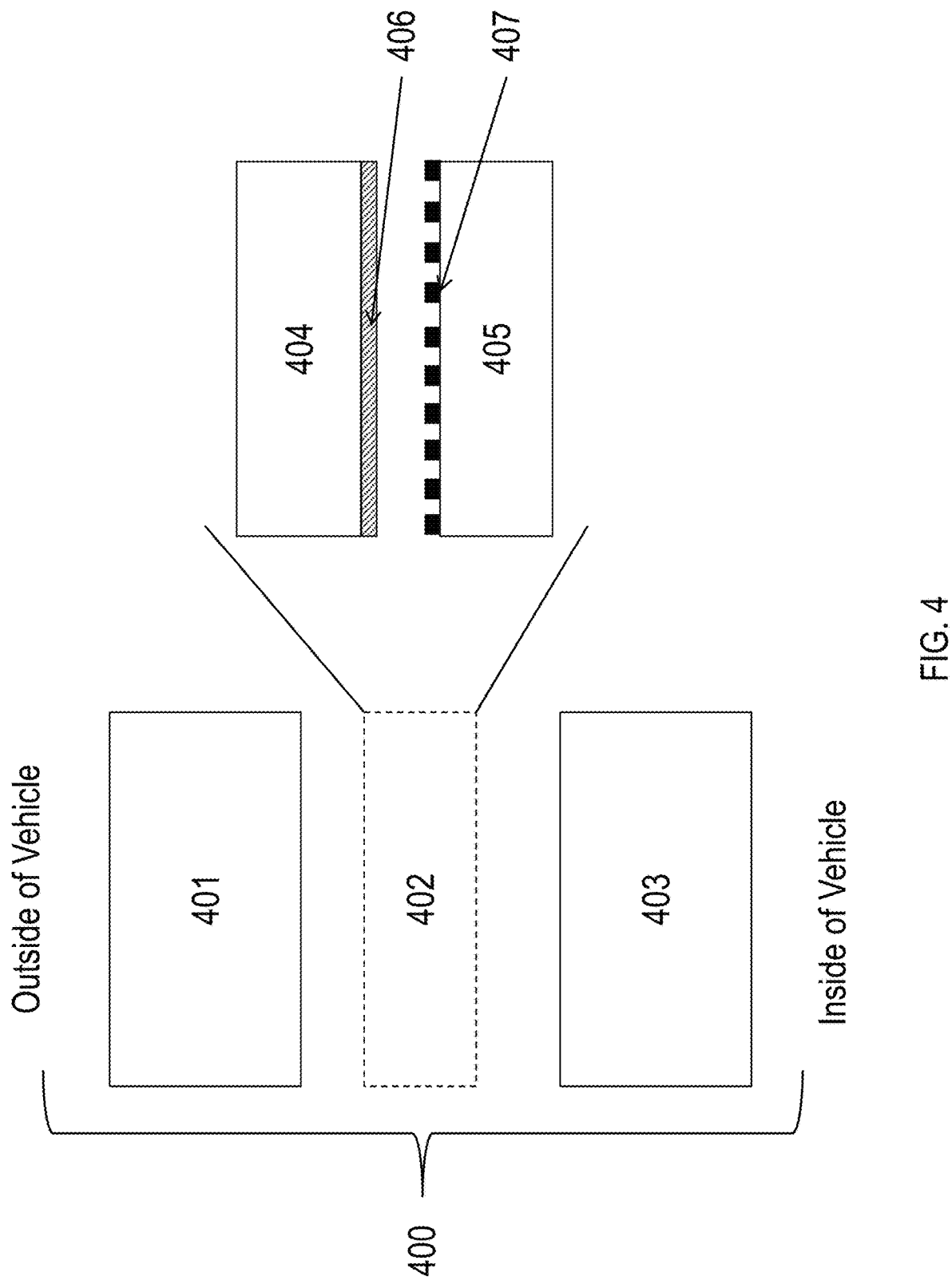
FIG. 4 illustrates an example of the glass structure according to some embodiments.

FIG. 4 illustrates an embodiment of glass structure 400 according to some embodiments. Glass structure 400 is substantially similar to glass structures 100 and 300 of the examples previously discussed and includes an outer layer of glass 401, an interlayer stack 402, and an inner layer of glass 403. Interlayer stack 402 is disposed between opposing surfaces of the outer layer of glass 401 and the inner layer of glass 403. Interlayer stack 402 is comprised of at least two interlayer substrates, 404 and 405.

Interlayer substrate 404 further includes decorative treatment 406. Decorative treatment 406 is printed directly onto interlayer substrate 404 and is disposed between interlayer substrates 404 and 405. Interlayer substrate 405 further includes functional component 407. Functional component 407 is attached directly to interlayer substrate 405 and is disposed between interlayer substrates 404 and 405. In some embodiments, interlayer substrate 404 includes functional component 407. In some embodiments, interlayer substrate 405 includes decorative treatment 406.

In some embodiments, one of decorative treatment 406 or functional component 407 is disposed between interlayer substrate 404 and outer layer of glass 401. In some embodiments, both decorative treatment 406 and functional component 407 are disposed between interlayer substrate 404 and outer layer of glass 401. In some embodiments, one of decorative treatment 406 or functional component 407 is disposed between interlayer 405 and inner layer of glass 403. In some embodiments, both decorative treatment 406 and functional component 407 are disposed between interlayer substrate 405 and inner layer of glass 403.

In some embodiments, decorative treatment 406 and functional component 407 are both included in interlayer substrate 404. In some embodiments, decorative treatment 406 and functional component 407 are both included in interlayer substrate 405. In some embodiments, decorative treatment 406 and functional component 407 are included on opposite sides of interlayer substrates 404 or 405. In some embodiments, decorative treatment 406 and functional component 407 are included on the same side of interlayer substrate 404 or 405. For example, decorative treatment 406 may be printed on one side of interlayer substrate 404 and functional component 407 may be epoxied or otherwise bonded on top of decorative treatment 406 on the same side of interlayer substrate 404.

Although in the present embodiment only one decorative treatment 406 is included in interlayer substrate 404 and one functional component 407 is included in interlayer substrate 405, it should be understood that interlayer stack 402 may include any number of feasible decorative treatments, functional components, and interlayer substrates. For example, interlayer stack 402 may include four interlayer substrates, and each of the interlayer substrates could include two decorative treatments and two functional components, one on each side, giving a total of eight possible decorative treatments and eight possible functional components.

Different interlayer substrates may be bonded together with any acceptable bonding agent, such as epoxy, resin, glue, etc. Interlayer substrates may also be bonded together through the application of heat and/or pressure as in an autoclave, parallel platen press, vacuum laminator, or vacuum bag. Further, the interlayer stack 402 may be bonded to the outer layer of glass 401 and the inner layer of glass 403 using any acceptable bonding agent, such as epoxy, resin, glue, etc. Interlayer substrates may also be bonded together or to the outer layer of glass 401 or the inner layer of glass 403 through the application of heat and/or pressure as in an autoclave, parallel platen press, vacuum laminator, or vacuum bag.

Figure 5A:
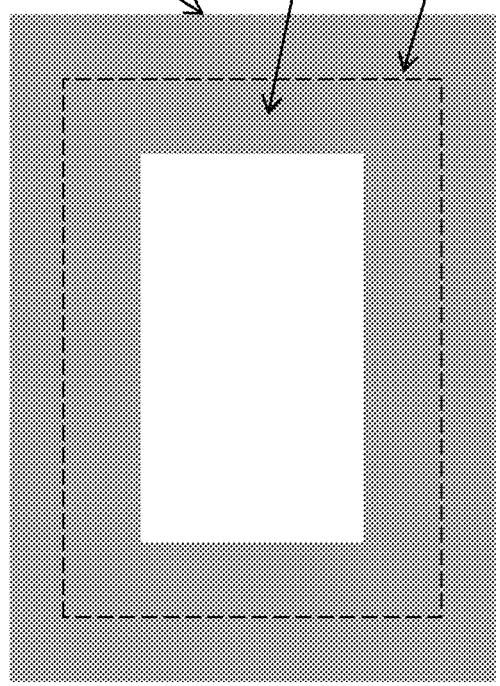
FIG. 5A-5C illustrates examples of the glass structure according to some embodiments.

FIG. 5A illustrates an example glass structure 500 according to some embodiments. Glass structure 500 is substantially similar to glass structures 100, 300, and 400 of the examples previously discussed. Glass structure 500 is a part of vehicle 510 and the boundary between glass structure 500 and vehicle 510 is denoted by the dotted line. Glass structure further includes an interlayer substrate which includes decorative treatment 502. Decorative treatment 502 demonstrates the flexibility of glass structure 500 by matching the color of the vehicle along the outside edge of decorative treatment 502 and being transparent in the center of decorative treatment 502. This kind of pattern creates an aesthetically pleasing transition from the color of the vehicle to the transparent nature typically expected in a window. This type of transition may be further enhanced when decorative treatment 502 is a fading pattern, as shown in FIG. 5B.

Figure 5B:
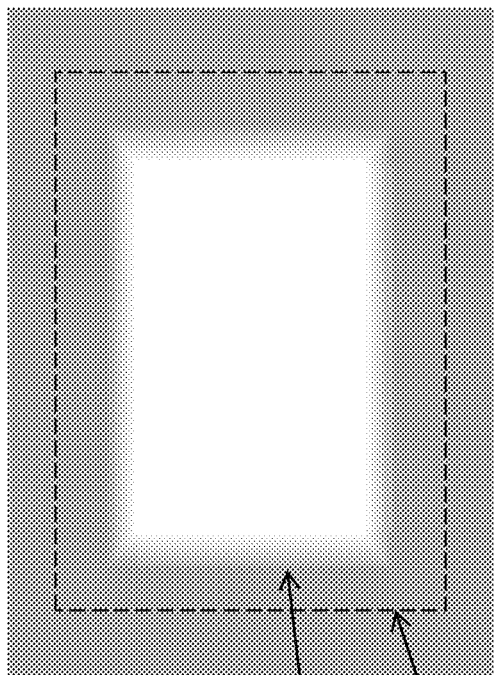

By incorporating patterns such as those shown in FIGS. 5A and 5B, unique decorations may be created in glass structure 500 that previously were not capable of being produced. This prevents the jarring transition from a color of the vehicle 510 to an opaque black decoration to the transparent nature of glass without any fade or gradient as can be found in conventional glass structures. This allows for a more natural look that may increase a user's enjoyment of the vehicle.

Figure 5C:
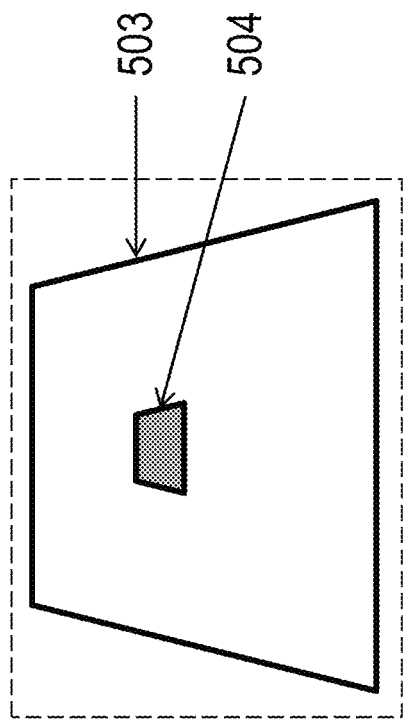

Additionally, decorative treatments may be applied even more selectively as shown in FIG. 5C. In FIG. 5C, glass structure 500 includes decorative treatments 503 and 504. Each of decorative treatment 503 and 504 is applied selectively in a pattern chosen by the designer. This allows each of decorative treatments 503 and 504 to provide specific functions in glass structure 500. For example, decorative treatment 503 may serve as an outline indicating where the glass structure will be attached to the vehicle. Decorative treatment 504 may indicate where an instrument, such as a camera, is to be placed on the inside of the vehicle that will need a specific view of the exterior of the vehicle. Further, decorative treatment 504 may include a pattern on the interior that changes the color or adds a tinting to provide the proper optic properties needed for a desired instrument.

This represents an improvement over conventional glass structures which, rather than allowing the printing of different patterns to different areas of an interlayer substrate, involved cutting and replacing various portions of an interlayer substrate with clear or colored substrates as desired. Cutting and replacing the substrate in this manner is time consuming, expensive, and may lead to delamination of the glass structure. In contrast, because decorative treatments 503 and 504 are printed onto the single interlayer substrate at the same time or in subsequent operations, many different patterns may be incorporated in an efficient manner that is easily repeated. Thus, the resulting glass structures are easier to produce than conventional systems and have a much lower probability of delaminating.

Figure 6:
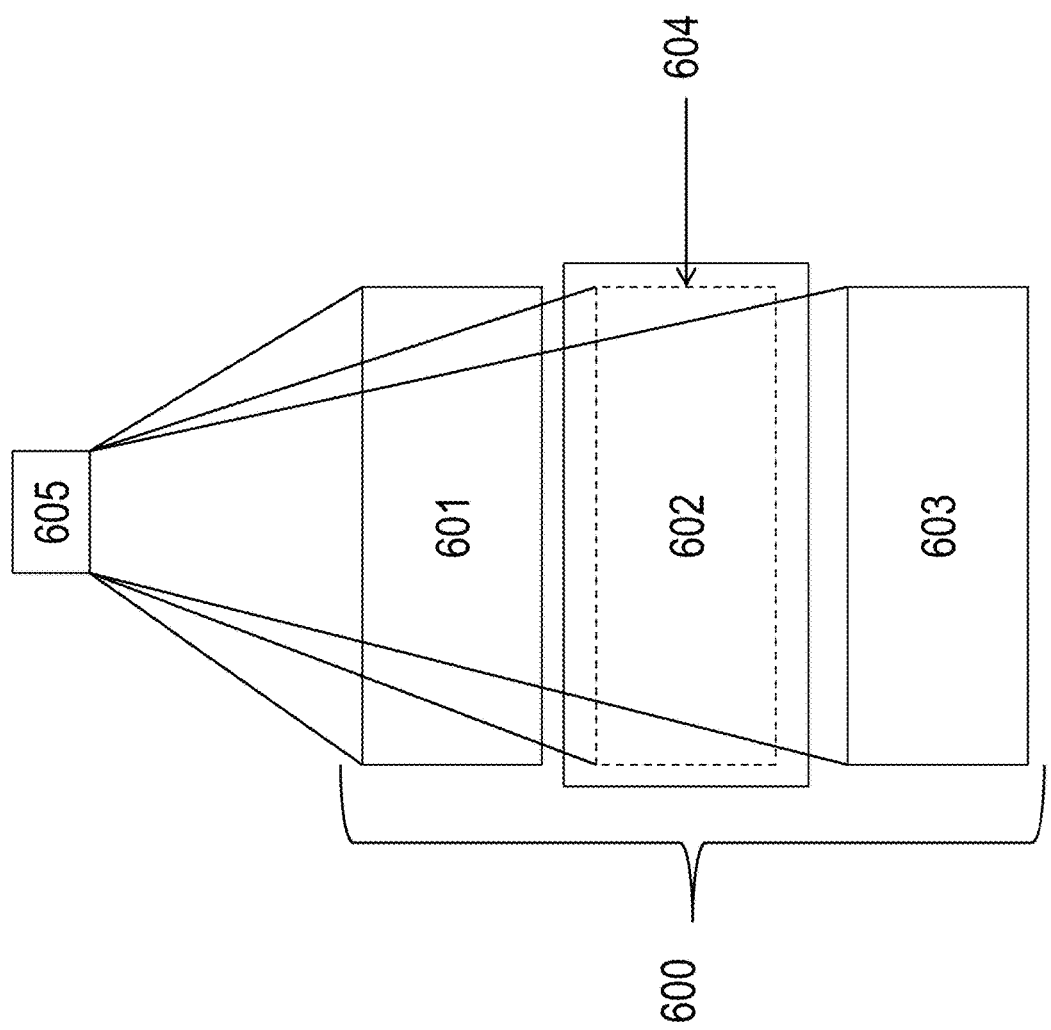
FIG. 6 illustrates an example of aligning components to create the glass structure according to some embodiments.

FIG. 6 illustrates an example of aligning components to create glass structure 600. Glass structure 600 is substantially similar to glass structures 100, 300, and 400 described in previous examples. Glass structure 600 includes outer layer of glass 601, interlayer stack 602, and inner layer of glass 603. Interlayer stack 602 includes an interlayer substrate which includes target datum marks 604. Target datum marks 604 are aligned with the outer layer of glass 601 and the inner layer of glass 603 in order to properly align the layers of glass with interlayer stack 602 prior to bonding the layers together.

To verify that the alignment of the outer layer of glass 601, the interlayer stack 602, and the inner layer of glass 603 is correct, a camera 605 is used to view the stack as a whole. Any acceptable reference points for alignment may be used by camera 605. For example, the camera 605 may compare target datum marks 604 to the edges of the layers of glass, the corners of the layers of glass, or any other feature. Incorporating the target datum marks 604 into the interlayer stack 602 allows for the alignment of the various decorative treatments and functional components within interlayer stack 602 with the correct portions of the glass, confirming that glass structure 600 is finished as desired with fewer defects. This is an improvement over conventional systems which requires manually stretching of the interlayer and aligning of the interlayer with the glass leading to frequent misalignments and a glass structure that is defective.

Possible thermoplastic polymers that may be used to create the interlayer substrates of the interlayer stack include oligomers, polymers, ionomers, dendrimers, copolymers such as graft copolymers, block copolymers (e.g., star block copolymers, random copolymers, and the like) or a combination comprising at least one of the foregoing.

Possible thermoplastic resins that may be used to create the interlayer substrates of the interlayer stack include polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (PI) (e.g., polyetherimides (PEI)), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazanes, polysiloxanes, fluoropolymers (e.g., polyvinyl fluorides (PVF), polyvinylidene fluorides (PVDF), fluorinated ethylene-propylenes (FEP), polyethylene tetrafluoroethylenes (ETFE)), polyethylene naphthalates (PEN), cyclic olefin copolymers (COC), polyvinyl butyral, ethylene vinyl acetate, thermoplastic urethane, polyethylene terephthalate, ionomer, non-plasticized polyvinyl butyral, thermoplastic urethane, aliphatic thermoplastic urethane, or a combination comprising at least one of the foregoing.

More particularly, a thermoplastic resin can include polycarbonate resins, polyphenylene ether-polystyrene resins, polyetherimide resins, polybutylene terephthalate-polycarbonate resins, copolyestercarbonate resins, polyvinyl butyral, ethylene vinyl acetate, thermoplastic urethane, polyethylene terephthalate, ionomer, non-plasticized polyvinyl butyral, thermoplastic urethane, aliphatic thermoplastic urethane, or a combination comprising at least one of the foregoing resins. Even more particularly, the thermoplastic resins can include homopolymers and copolymers of a polycarbonate, a polyester, a polyacrylate, a polyamide, a polyetherimide, a polyphenylene ether, polyvinyl butyral, ethylene vinyl acetate, thermoplastic urethane, polyethylene terephthalate, ionomer, non-plasticized polyvinyl butyral, thermoplastic urethane, aliphatic thermoplastic urethane, or a combination comprising at least one of the foregoing resins.

A polymer of the interlayer stack can include various additives ordinarily incorporated into polymer compositions of this type. Such additives can be mixed at a desirable time during the mixing of the components for forming the composition. Exemplary additives include fillers, reinforcing agents, antioxidants, heat stabilizers, light stabilizers, ultraviolet (UV) light stabilizers, infra-red (IR) light absorbers, plasticizers, antistatic agents, colorants such as titanium dioxide, carbon black, and organic dyes, surface effect additives, radiation stabilizers, and flame retardants. A combination of additives can be used, for example a combination of a heat stabilizer, infra-red light absorbers, and ultraviolet light stabilizer. The total amount of additives is generally 0.01 to 5 weight percentage, based on the total weight of the composition. Light stabilizers and/or ultraviolet light (UV) absorbing stabilizers can also be used. Exemplary light stabilizer additives include benzotriazoles such as 2-(2-hydroxy-5-methylphenyl)-benzotriazole, 2-(2-hydroxy-5-tert-octylphenyl)-benzotriazole and 2-hydroxy-4-noctoxy benzophenone, or combinations comprising at least one of the foregoing light stabilizers. Light stabilizers are used in amounts of 0.01 to 5 parts by weight, based on 100 parts by weight of the total composition, excluding any filler.

UV light absorbing stabilizers include triazines, dibenzoylresorcinols (such as TINUVIN™ 1577 commercially available from BASF and ADK STAB LA-46 commercially available from Asahi Denka), hydroxybenzophenones; hydroxybenzotriazoles; hydroxyphenyl triazines (e.g., 2-hydroxyphenyl triazine); hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane; nano-size inorganic materials such as titanium oxide, cerium oxide, and zinc oxide, all with a particle size less than or equal to 100 nanometers, or combinations comprising at least one of the foregoing UV light absorbing stabilizers. UV light absorbing stabilizers are used in amounts of 0.01 to 5 parts by weight, based on 100 parts by weight of the total composition, excluding any filler.

One of skill in the art will recognize that the glass structures described herein may be used in a number of ways in vehicles to create surfaces with increased strength and improved functionality. In this way safer, more aesthetically pleasing, and useful windows may be incorporated into vehicles, resulting in a vehicle that may perform more functions in a more flexible way.

In some embodiments, a glass structure for a vehicle (e.g., 100) includes an outer layer of glass (e.g., 101), an inner layer of glass (e.g., 103), and an interlayer stack (e.g., 102), the interlayer stack being disposed between opposing surfaces of the outer layer of glass and the inner layer of glass. In some embodiments, the interlayer stack comprises at least two interlayer substrates (e.g., 104, 105) and at least one of the interlayer substrates includes a decorative treatment (e.g., 106). In some embodiments, the decorative treatment is disposed on one surface of the at least one interlayer substrate. In some embodiments, the decorative treatment matches the color of the vehicle. In some embodiments, the decorative treatment comprises a pattern. In some embodiments, the pattern fades from the color of the vehicle to transparent. In some embodiments, at least one of the interlayer substrates includes a functional component (e.g., 306). In some embodiments, the functional component is one of a conductive system, a communications antennae, or a display. In some embodiments, each of the interlayer substrates includes a decorative treatment. In some embodiments, each of the interlayer substrates includes two decorative treatments. In some embodiments, at least one of the interlayer substrates is comprised of polyvinyl butyral. In some embodiments, at least one of the interlayer substrates is comprised of polyethylene terephthalate. In some embodiments, interlayer stack further comprises target datum marks disposed on the interlayer substrates (e.g., 604).

The foregoing disclosure is not intended to limit the present disclosure to the precise forms or particular fields of use disclosed. As such, it is contemplated that various alternative embodiments and/or modification to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the glass structure. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A glass structure for a vehicle, the glass structure comprising:
    an outer layer of glass;
    an inner layer of glass; and
    an interlayer stack disposed between opposing surfaces of the outer layer of glass and the inner layer of glass, wherein the interlayer stack comprises: at least two interlayer substrates, and at least one of the interlayer substrates includes a decorative treatment;
        wherein the decorative treatment comprises:
            a first applied color applied to the at least one of the interlayer substrates; and
            a second applied color applied to the at least one of the interlayer substrates;
        wherein the second applied color is transparent;
        wherein the first applied color is different than the second applied color; and
        wherein the first applied color and the second applied color define a pattern; and
        wherein the pattern comprises the first applied color fading to the second applied color.

2. The glass structure of claim 1, wherein the decorative treatment is disposed on one surface of the at least one interlayer substrate.

3. The glass structure of claim 1, wherein the first color matches a color of the vehicle.

4. The glass structure of claim 1, wherein the decorative treatment is applied to the center of the at least one interlayer substrate.

5. The glass structure of claim 1, wherein at least one of the interlayer substrates further includes a functional component.

6. The glass structure of claim 5, wherein the functional component is one of a conductive system, a communications antennae, or a display.

7. The glass structure of claim 1, wherein each of the interlayer substrates includes a decorative treatment.

8. The glass structure of claim 7, wherein each of the interlayer substrates includes two decorative treatments.

9. The glass structure of claim 1, wherein at least one of the interlayer substrates is comprised of polyvinyl butyral.

10. The glass structure of claim 1, wherein at least one of the interlayer substrates is comprised of non-plasticized polyvinyl butyral.

11. The glass structure of claim 1 wherein the decorative treatment is printed onto the interlayer substrate.

12. A glass structure for a vehicle, the glass structure comprising:
    an outer layer of glass;
    an inner layer of glass; and
    an interlayer stack disposed between opposing surfaces of the outer layer of glass and the inner layer of glass, wherein the interlayer stack comprises: at least two interlayer substrates, target datum marks disposed on the interlayer substrates, and at least one of the interlayer substrates includes a decorative treatment.

* * * * *